United States Patent
Maier et al.

(10) Patent No.: US 6,948,457 B2
(45) Date of Patent: Sep. 27, 2005

(54) FAN ARRANGEMENT OF A PORTABLE HANDHELD WORK APPARATUS DRIVEN BY AN INTERNAL COMBUSTION ENGINE

(75) Inventors: Georg Maier, Kernen (DE); Fritz Kiesewetter, Stuttgart (DE)

(73) Assignee: Andreas Stihl AG. & Co. KG, Waiblingen (DE)

( * ) Notice: Subject to any disclaimer, the term of this patent is extended or adjusted under 35 U.S.C. 154(b) by 0 days.

(21) Appl. No.: 10/671,685

(22) Filed: Sep. 29, 2003

(65) Prior Publication Data

US 2004/0083988 A1 May 6, 2004

(30) Foreign Application Priority Data

Sep. 28, 2002 (DE) .......................................... 102 45 419

(51) Int. Cl.[7] .................................................. F01P 1/00
(52) U.S. Cl. ....................... 123/41.65; 123/41.7; 55/437
(58) Field of Search ............................ 123/41.7, 41.65; 55/437, 438

(56) References Cited

U.S. PATENT DOCUMENTS 5,231,956 A * 8/1993 Lux et al. ................ 123/41.65
5,367,988 A 11/1994 Collins

* cited by examiner

*Primary Examiner*—Andrew M. Dolinar
*Assistant Examiner*—Katrina Harris
(74) *Attorney, Agent, or Firm*—Walter Ottesen

(57) ABSTRACT

A fan arrangement of a portable handheld work apparatus is driven by an internal combustion engine and includes a radial fan (1) which includes a fan wheel (5) and a spirally-shaped fan housing (6) which encloses the fan wheel (5) at least partially. A take-out opening (3) is provided in the radial fan (1) in the region of the moved air flow (2) for diverting a combustion air flow (4) for the engine. The combustion air flow (4) is branched off from the air flow (2). In the radial direction outside of the fan wheel (5), there is an aerodynamically formed guide ramp (7) provided in the air flow (2) which rises in the axial direction. The take-out opening (3) is arranged downstream of the guide ramp (7).

14 Claims, 4 Drawing Sheets

FAN ARRANGEMENT OF A PORTABLE HANDHELD WORK APPARATUS DRIVEN BY AN INTERNAL COMBUSTION ENGINE

BACKGROUND OF THE INVENTION

Portable handheld work apparatus, which are driven by an internal combustion engine, have a radial fan for cooling the engine in known embodiments. These work apparatus include chain saws, brushcutters, suction/blower apparatus or the like. The radial fan includes a fan wheel and a spirally-shaped fan housing at least partially enclosing the fan wheel. The fan wheel is assembled on the crankshaft of the engine and rotates at the same rpm. The fan wheel can also be used for controlling an ignition system of the engine by utilizing the rotation of the fan wheel which is in synchronism with the crankshaft. For this purpose, an ignition coil and an ignition magnet, which rotates with the fan wheel, are so arranged with respect to each other that an ignition in the engine is caused by the ignition magnet running by the ignition coil at a preadjusted time point. The ignition magnet is fixed on the fan wheel and the ignition coil projects into the interior space of the fan housing.

Embodiments of a fan arrangement of such work apparatus are known wherein a take-out opening is provided in the radial fan in the region of the moved air flow. The take-out opening diverts a combustion air flow for the internal combustion engine branched out from the air flow. A backup pressure is caused by the high speed of the cooling air flow and, by utilizing this backup pressure, the branched-off combustion air flow is fed at an overpressure through a combustion air channel to the carburetor of the engine.

During operation of a portable handheld work apparatus under corresponding ambient conditions, dust particles or the like can be drawn in by suction by the cooling fan wheel which are entrained and moved within the cooling fan together with the air flow to be moved. Various embodiments of so-called preseparators are known by means of which the particles entrained in the air flow are intended to be held away from the take-out opening for the combustion air flow. The effect of such preseparators is dependent upon the position and the flow conditions and is therefore not always satisfactory. The dirt particles, which are conducted away through the take-out opening and are supplied together with the combustion air flow to the carburetor, can lead to an unwanted high load on an air filter mounted forward of the carburetor. As a consequence, frequent exchanges of filters result and reduce the efficiency of such work apparatus. The arrangement of take-out opening and preseparators in the fan unit can also lead to a disadvantageous influencing of the moved cooling air flow and therefore the targeted cooling capacity. Furthermore, the achievable pressure gain in the combustion air flow is not always satisfactory.

SUMMARY OF THE INVENTION

It is an object of the invention to provide a fan arrangement of the kind described above which is improved with respect to the pressure take-out of a combustion air flow.

The fan arrangement of the invention is for an internal combustion engine including an engine of a portable handheld work apparatus. The fan arrangement includes: a fan wheel for acting on air to move the air in an air flow defining a flow direction; a fan housing at least partially surrounding the fan wheel; a take-out opening disposed in the region of the air flow to branch off a component of the air flow as a combustion air flow for the internal combustion engine; an aerodynamically formed guide ramp disposed outside of the fan wheel in radial direction; the guide ramp rising in axial direction; and, the take-out opening being disposed downstream of the guide ramp.

For the above, it is suggested to provide an aerodynamically formed guide ramp in the air flow radially outside of the fan wheel and this guide ramp rises in axial direction. The take-out opening is arranged downstream of the guide ramp. The guide ramp effects a redirection of the air flow, which is moved by the fan, in such a way that a component of the air flow is directed in the axial direction. Entrained dirt particles likewise take on a flight path with an axially directed component. The direction deflection of the particles takes place, on the one hand, by a guide action of the deflected air flow and, on the other hand, several particles can impinge against the guide ramp whereby they likewise obtain an axial directional component when deflected. Because of the mass inertia of the dirt particles (which is greater compared to the air flow), this axial velocity component is maintained at least partially even downstream of the guide ramp. The take-out opening for the combustion air flow, which is arranged there, therefore is subjected to an air flow which is essentially free of entrained dirt particles because of the axial deflection. The arrangement of guide ramp and downstream take-out opening thereby forms an effective preseparators system via which purified combustion air can be supplied to the engine.

The aerodynamic shape of the guide ramp avoids flow losses in the fan whereby the cooling power remains unaffected. However, a slight eddy development downstream of the guide ramp leads to an increased back pressure in the region of the take-out opening. The combustion air flow can be supplied to the carburetor with an increased gain of pressure whereby a power increase of the engine can be achieved.

To increase the preseparators action, the guide ramp and the take-out opening are advantageously mounted in radial direction close to the peripheral contour of the fan wheel. In this region, the air flow, which is moved by the fan, has a peripheral direction with a radially outwardly directed component because of the spiral configuration of the fan housing. The centrifugal forces, which are caused by the curved path, in combination with the outwardly directed velocity component leads, in addition to the axial deflection (which is caused by the guide ramp), to a radially outwardly directed separation of entrained dirt particles. A radially inner-lying arrangement of the take-out opening permits the extraction of combustion air with a still further increased degree of purification.

For a good aerodynamic action, the guide ramp is so configured that it extends in radial direction approximately from the peripheral contour of the fan wheel to a radially outer peripheral wall of the fan housing. In this way, the formation of peripheral eddies is prevented which would counter the deflecting action. With a configuration of the guide ramp with a contour, which is first concave in the flow direction and then convex, an eddy-burdened local interruption of the flow is avoided. The convex contour leads to a back deflection of the air flow as loss-free as possible into the rotational plane of the fan wheel. The entrained dirt particles at least partially retain their axial velocity component because of their mass inertia. The avoidance of a formation of eddies prevents an unwanted back deflection of the particles deflected away from the take-out opening as well as flow losses.

In an advantageous embodiment, the guide ramp is arranged as a flow shroud of an ignition coil in flow direction directly ahead of the ignition coil. The ignition coil projects into the interior space of the fan housing. Additional eddy formations, which are caused by the ignition coil, are avoided. The ignition coil thereby becomes an aerodynamic guide body in combination with the guide ramp upstream therefrom. This guide body amplifies the deflecting action while avoiding flow losses. The guide ramp functions also as protection for the ignition coil against particles impinging at high velocity. The tendency of contamination of the ignition system is thereby reduced.

In an advantageous embodiment, a downhill second guide ramp is disposed downstream of the guide ramp. The second guide ramp is expanded in flow cross section. The flow cross section in the fan can, as required, be essentially uninfluenced in the region of the ignition module because of the radial expansion of the spiral. It is also possible to again expand the flow cross section right after the first guide ramp in order to prevent flow losses. Furthermore, in this region, a plurality of possibilities for arranging the take-out opening is provided. For example, the take-out opening can be arranged in the region of the second guide ramp in such a manner that it is at least partially covered by the first guide ramp whereby a certain shielding action can result. For achieving a high gain in pressure in the combustion air flow, the take-out opening is arranged directly after the ignition coil in flow direction whereby the flow cross section, which is correspondingly influenced by the first guide ramp, again assumes essentially the original form. The jet action of the narrowed flow cross section leads to an acceleration of the air flow and therefore to an increase of the back pressure which acts as a wanted overpressure in the combustion air flow. The increased flow velocity in the region of the narrowed cross section leads also to higher centrifugal forces, which act on the entrained dirt particles, and this increases the separator action in this region.

It can be practical to bring a channel for combustion air axially through a wall of the fan housing with this channel leading from the take-out opening to the engine. This wall of the fan housing extends radially to the rotation axis. Alternatively, a configuration can be provided wherein the combustion air channel is continued in a cover of the fan housing. In both cases, the combustion air channel forms no flow obstacle in the cooling air flow.

In an advantageous manner, a baffle wall for screening with respect to the fan wheel is provided in the region of the take-out opening. This baffle wall follows the peripheral contour of the fan wheel and rises in axial direction. The baffle wall extends at least partially over the ignition coil opposite the flow direction. The baffle wall leads to the situation that the total air quantity is increased so that the cooling air quantity as well as the combustion air quantity are increased. In addition to the entry of dirt particles directly from the fan wheel into the region of the take-out opening, the baffle wall additionally avoids a direct entry into the flow region flowing around the ignition coil. This narrowed and therefore accelerated flow region exhibits an increased degree of purification because of the above-described centrifugal forces. A negative effect on the increased degree of purification is avoided because of the arrangement of the baffle plate in this region. To increase the action of the suggested arrangement, a guide surface, referred to the flow direction behind the first guide ramp, is arranged which lies especially between the ignition coil and the second guide ramp. This guide surface is aligned approximately horizontally and lies approximately at the elevation of the first guide ramp. The take-out opening is partitioned into a vertical window, which extends in axial direction, and a horizontal window which lies in the guide surface. With this arrangement, it has been shown that a removal of combustion air at high pressure gain is possible with simultaneously low effect on the cooling air flow. At the same time, a high separator action with low entry of dirt particles into the take-out opening is observed.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
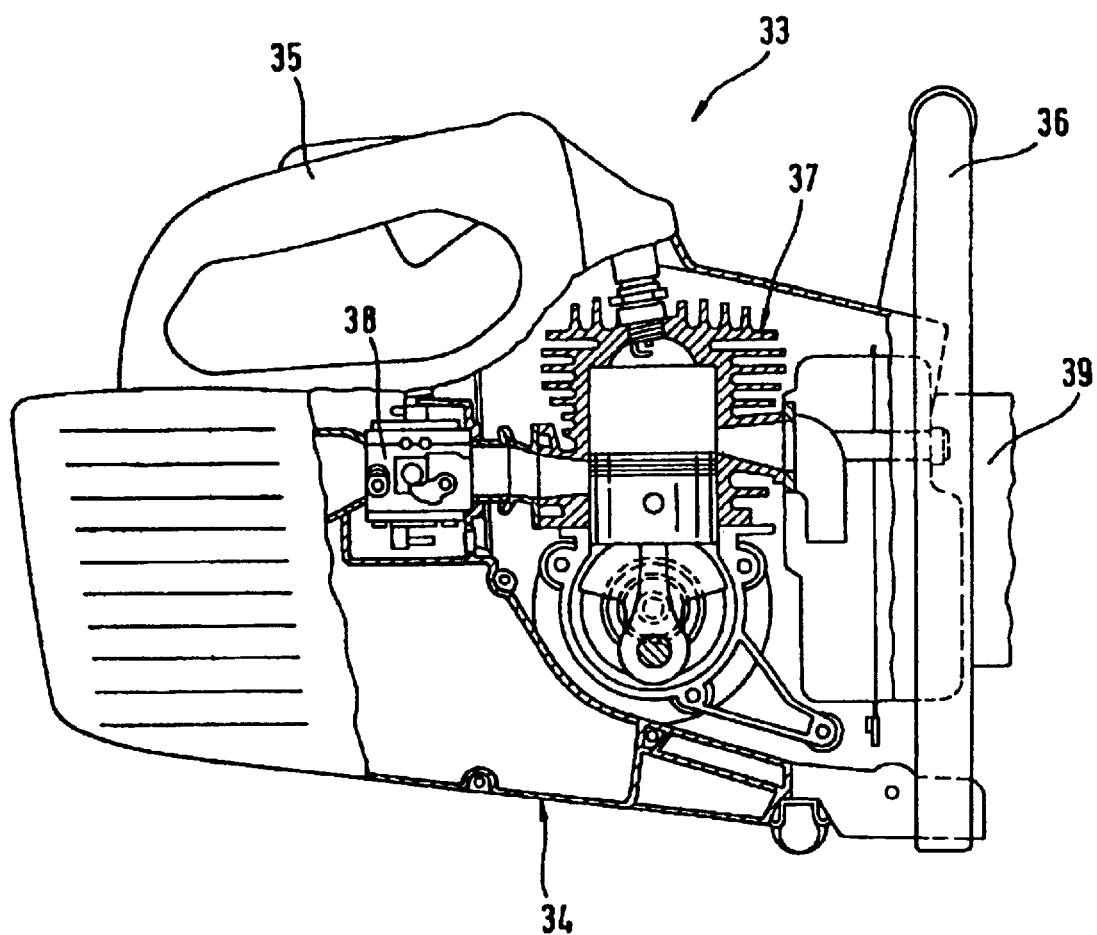
FIG. 1 is a schematic, partially in section, of a work apparatus.

FIG. 1 shows a work apparatus 33 partially in section. The work apparatus includes a housing 34 having an internal combustion engine mounted therein and a work tool 39 driven by the engine. An upper handle 35 and a forward handle 36 are arranged on the housing. A carburetor 38 is provided ahead of the engine 37.

Figure 2:
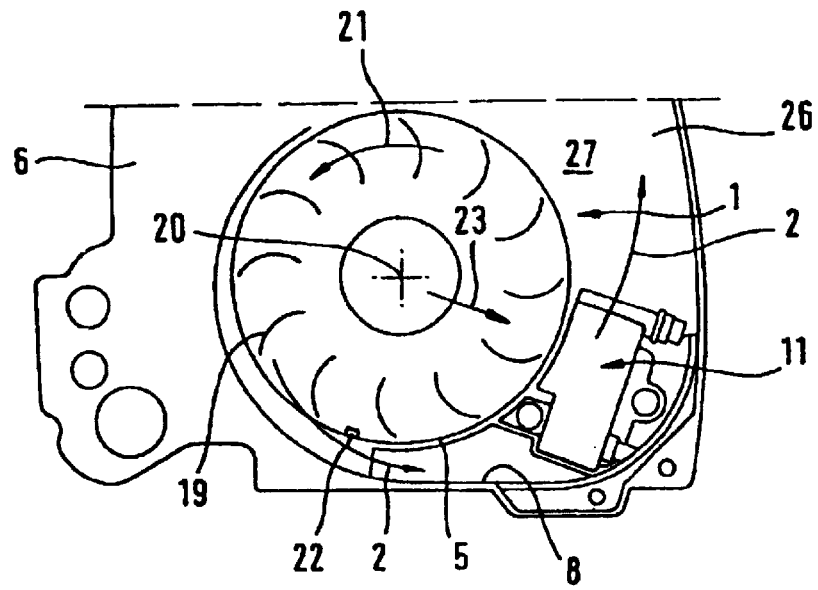
FIG. 2 is a schematic which shows the essential components of a fan arrangement.

FIG. 2 shows a schematic representation of essential components of the radial fan 1. The radial fan 1 includes a fan wheel 5 and a spirally-shaped fan housing 6 which at least partially encloses the fan wheel 5. Only an open half shell is shown of the fan housing 6 for the sake of clarity. The half shell has an end wall 27 which lies in a plane of the fan wheel 5 and has a spirally-shaped expanding peripheral wall 8 which lies radially outside of the fan wheel 5.

The fan wheel 5 includes a plurality of vanes 19 and is rotatably journalled about a rotation axis 20. With the rotation of the fan wheel 5 in the rotational direction indicated by arrow 21, an air flow is moved in the radial fan 1 indicated by the arrow 2. This air flow is in the peripheral direction and has a component directed radially from the interior toward the outside and is discharged at a discharge opening 26. The fan arrangement shown is part of a portable handheld work apparatus driven by an internal combustion engine (not shown). Such a work apparatus can, for example, be a chain saw, a brushcutter, a suction/blower apparatus or the like. The air flow 2 is provided primarily for cooling the engine.

An ignition coil 11 projects into the interior space of the fan housing 6 and is so arranged that it lies with its periphery close to the fan wheel 5. A magnet 22 is provided which is fixed on the fan wheel 5 and rotates therewith. When the fan wheel 5 rotates synchronously to the crankshaft rotation in the direction of arrow 21, the magnet 22 passes cyclically at the ignition coil 11 whereby an ignition is effected in the engine at predetermined time points. In lieu of the fan wheel shown in the drawing, a so-called light-weight wheel can be provided.

Figure 3:
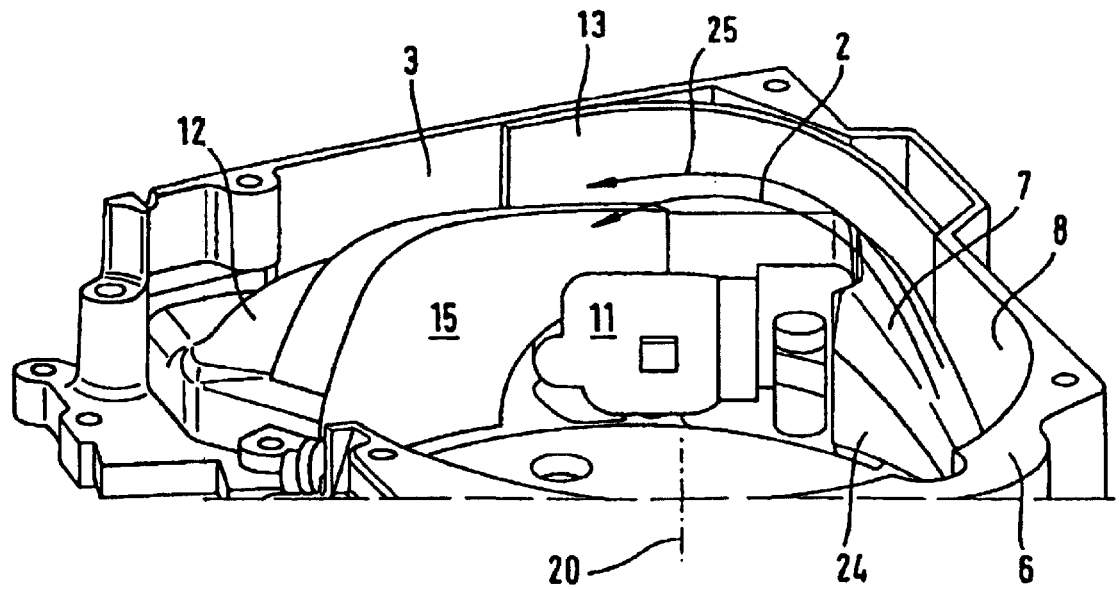
FIG. 3 is a perspective view of details of the arrangement of FIG. 2 with guide ramps arranged at both sides of an ignition coil.

FIG. 3 shows a perspective view of the arrangement of FIG. 2 approximately from the direction as indicated in FIG.

2. The designations "horizontal", "vertical" and "radial" refer to the rotational axis 20. A vertical direction lies in the direction of the rotational axis 20; whereas, a horizontal direction lies perpendicular to the rotational axis 20 in the rotation plane of the fan wheel 5 (FIG. 2).

Referred to the peripheral direction of the air flow 2, a guide ramp 7 is mounted as a flow shroud of the ignition coil 11 directly ahead of the ignition coil. The ignition coil 11 projects into the interior space of the fan housing 6. The guide ramp 7 lies, in radial direction, outside of the fan wheel 5 (FIG. 2) and rises from the end wall 27 (FIG. 2) with an aerodynamic shape in axial direction. The guide ramp at its apex point reaches approximately the elevation of the ignition coil 11.

The guide ramp 7 is delimited on the inner side by an inner wall 24 and radially outwardly by the peripheral wall 8. The inner wall 24 lies directly outside of the fan wheel 5. The guide ramp 7 extends in radial direction approximately from the outer contour of the fan wheel 5 up to the radially outer peripheral wall 8 of the fan housing 6.

The guide ramp 7 and the ignition coil 11 are followed by a downhill second guide ramp 12. This guide ramp expands the flow cross section in the region of the ignition coil 11. A take-out opening 3 is arranged between the first and second guide ramps (7, 12) and is described in greater detail hereinafter.

The direction of the moved air flow is shown by arrow 2. In correspondence to this direction, the air flow follows a curved course with an axial directional component caused by the guide ramp 7. Dirt particles, which are entrained in the air flow 2, follow a particle path shown approximately by arrow 25. This particle path runs in radial direction outside of and in vertical direction above the air flow direction shown by arrow 2.

In lieu of the arrangement of the guide ramp 7 and the take-out opening 3 in radial direction close to the peripheral contour of the fan wheel 5 (FIG. 2), an arrangement, for example, in the region of the discharge opening 26 (FIG. 2) can also be practical.

Figure 4:
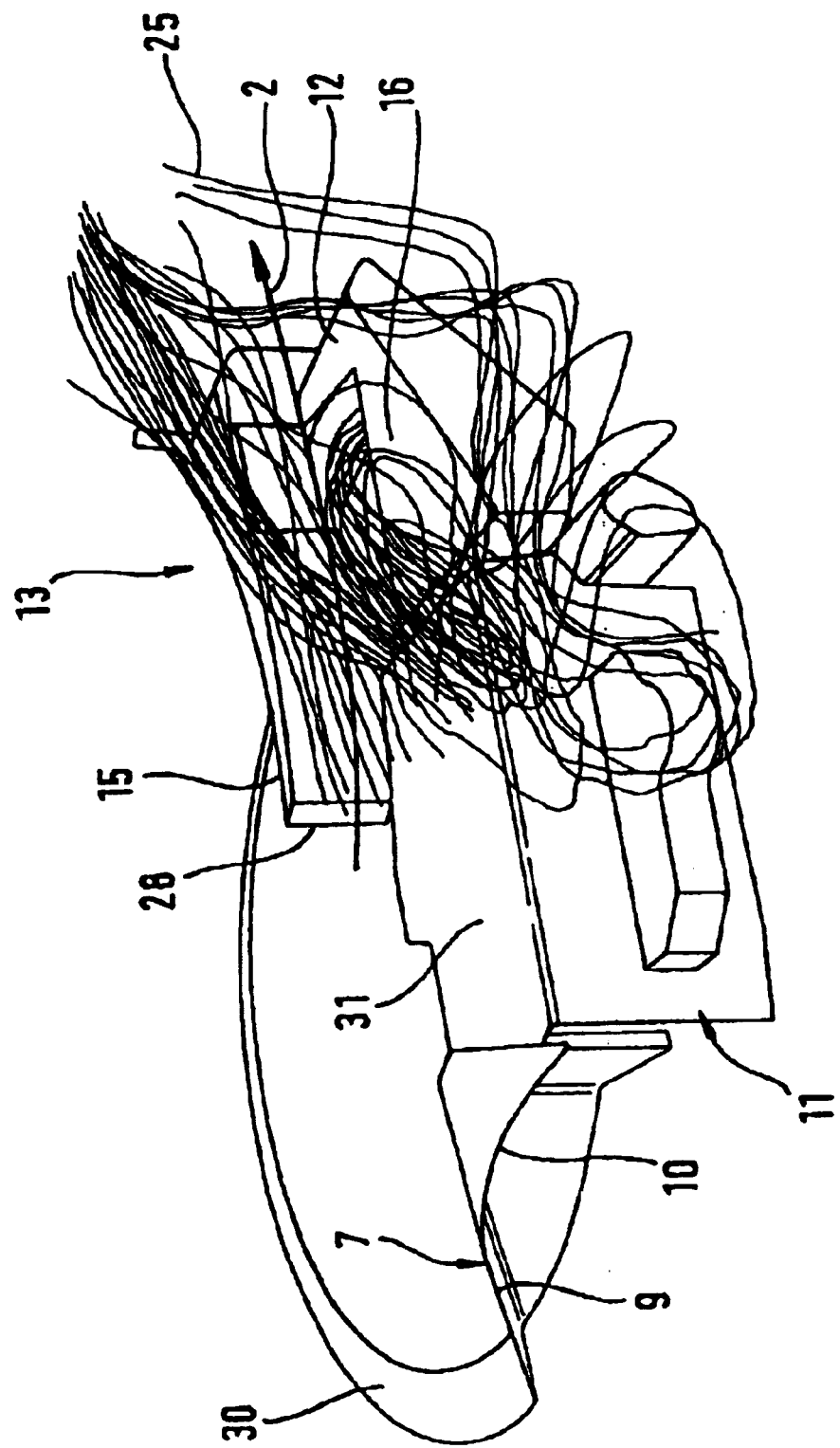
FIG. 4 is a further perspective view of details of the arrangement of FIG. 3 with a horizontally-lying guide surface and a baffle wall arranged vertically.

Details of the arrangement of FIG. 2 are shown in the perspective view of FIG. 4. The course of the end wall 27 outside of the fan wheel 5 (FIG. 2) and therefore the radial width direction of the air flow 2 is given by the spirally-shaped expanding region 30. The first guide ramp 7 is mounted directly ahead of the ignition coil 11 and has first a concave contour in flow direction and thereafter a convex contour 10. The convex contour 10 passes approximately horizontally into the upper surface 31 of the ignition coil 11. Referred to the flow direction behind the first guide ramp 7 and behind the surface 31 of the ignition coil 11, an approximately horizontally directed guide surface 16 is provided which lies approximately at the elevation of the first guide ramp 7, that is, at the elevation of the surface 31. The guide surface 16 passes downstream into the second guide ramp 12. The guide surface 16 lies between the ignition coil 11 and the second guide ramp 12.

The take-out opening 3 is disposed downstream of the first guide ramp 7 and directly after the ignition coil 11 in flow direction in the embodiment shown. In this region between the first guide ramp 7 and the second guide ramp 12, a flow cross section 13 of the air flow 2 is provided which is narrowed in correspondence to the axial rise of the two guide ramps (7, 12). A combustion air channel which leads from the take-out opening 3 to the carburetor of the engine is provided.

A baffle wall 15 for screening against the fan wheel 5 is provided bordering in radial direction on the peripheral side of the fan wheel 5 (FIG. 2) in the region of the take-out opening 3. The baffle wall 15 follows the outer contour of the fan wheel 5 and rises vertically in the axial direction. The baffle wall 15 extends with its forward edge 28 opposite to the direction of the air flow 2 approximately over half of the ignition coil 11. Depending upon the application, an extension between 0% and 100% of the dimension of the ignition coil 11 is practical. This dimension lies in the peripheral direction. A baffle wall 15 of this kind affords the advantage that the total air quantity can be increased.

The multiplicity of lines 25 show computed particle paths and, as shown, only a very small portion of the particles reaches the take-out opening 3 from the air flow 2.

Figure 5:
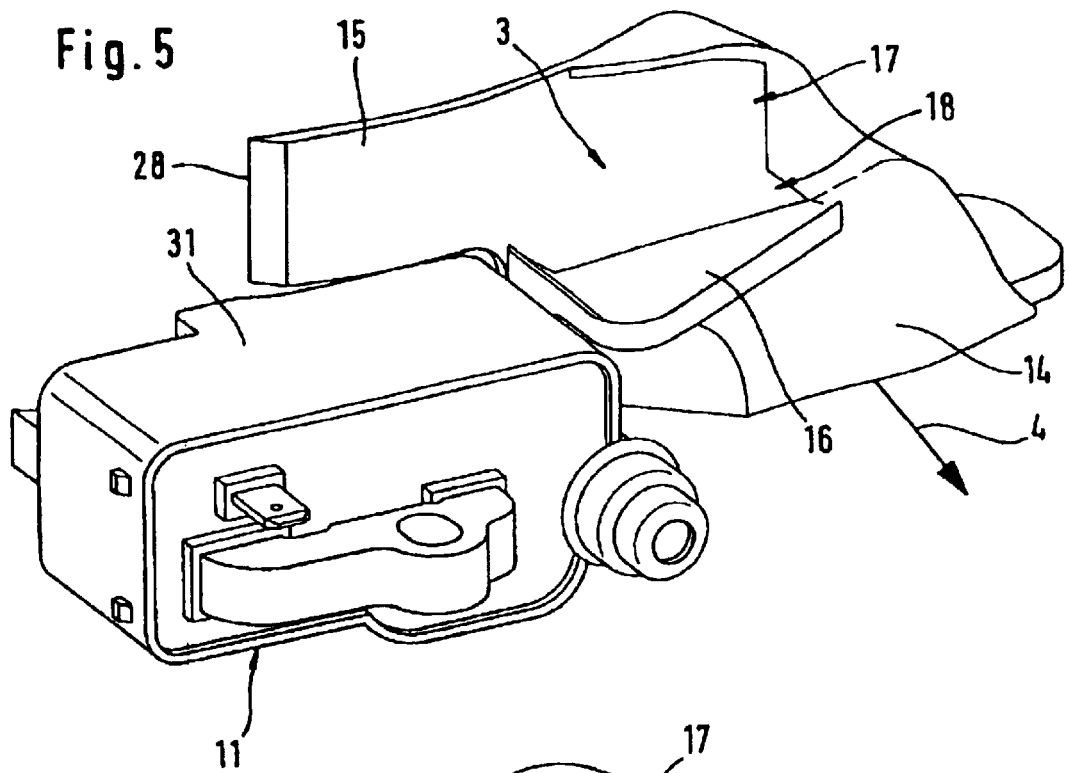
FIG. 5 is a view of an ignition coil and the separator having a take-out opening with the separator being arranged next to the ignition coil; and, FIG. 6 is another view of the arrangement of FIG. 5.
Figure 6:
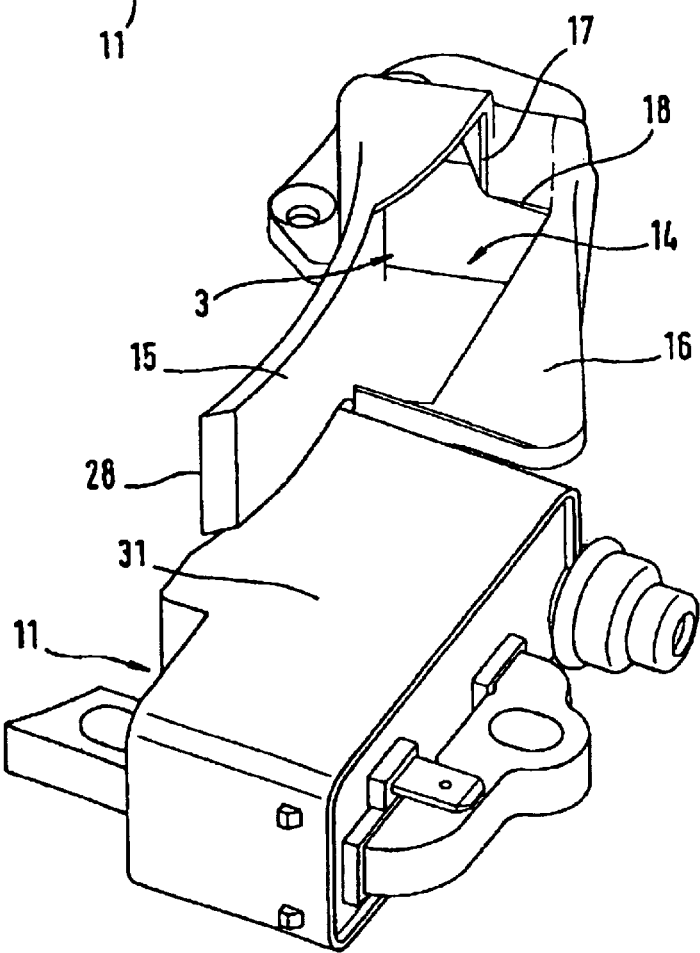

FIGS. 5 and 6 show respective views of the ignition coil and the separator of the arrangement of FIG. 4 from which details can be seen in the region of the take-out opening 3. The take-out opening 3 is provided for diverting a combustion air flow branched out from the air flow 2 (FIGS. 2 to 4). The combustion air flow is branched off from the air flow 2 by means of the take-out opening 3 and is conducted away through a combustion air channel 14 and is supplied to the carburetor of the engine. The combustion air channel 14 has a direction which leads through a radial wall of the fan housing so that the combustion air is conducted axially from the fan housing. Alternatively, it can also be provided that the combustion air channel is guided in a direction toward the cover of the fan and a corresponding channel continues in the cover.

The baffle wall 15 extends with its forward edge 28 upstream of the take-out opening 3. The take-out opening 3 lies in the region of the transition from the horizontal guide surface 16 to the vertically-extending baffle wall 15. The take-out opening 3 is partitioned into a vertical window 17 as well as into a horizontal window 18. The vertical window 17 extends in the axial direction and in the peripheral direction and the horizontal window 18 lies in the plane of the guide surface 16. The take-out opening 3 is limited with respect to the vertical window 17 by the curved baffle wall 15 on the inner side and, with reference to the horizontal window 18, downwardly by a base plate dropping off at an incline and rearwardly in the form of a curved ramp.

It is understood that the foregoing description is that of the preferred embodiments of the invention and that various changes and modifications may be made thereto without departing from the spirit and scope of the invention as defined in the appended claims.

What is claimed is:

1. A fan arrangement of an internal combustion engine including an engine of a portal handheld work apparatus, the fan arrangement comprising:

a fan wheel for acting on air containing entrained dirt particles so as to move said air in an air flow along a flow path;

said fan wheel defining a rotational axis;

a fan housing at least partially surrounding said fan wheel;

an aerodynamically formed guide ramp disposed outside of said fan wheel in radial direction and said guide ramp being formed so as to rise in the direction of said rotational axis with the course of said air flow so as to deflect a first component of said air flow together with said dirt particles in the direction of said rotational axis; and, a take-out opening disposed downstream of said guide ramp in the region of said air flow to branch off a second component of said air flow as a combustion air flow for said internal combustion engine substantially free of said dirt particles.

2. The fan arrangement of claim 1, wherein said fan wheel define a peripheral contour; and, said guide ramp and said take-out opening are mounted close to said peripheral contour.

3. The fan arrangement of claim 2, wherein said fan housing has a radial outer peripheral wall and said guide ramp extends in radial direction approximately from said peripheral contour up to said radial outer peripheral wall of said fan housing.

4. The fan arrangement of claim 3, wherein said guide ramp has a concave contour and thereafter a convex contour in said flow direction.

5. The fan arrangement of claim 4, wherein said engine includes an ignition coil projecting into said fan housing and said guide ramp is mounted directly forward of said ignition coil viewed in said flow direction and said guide ramp is configured as a flow shroud for said ignition coil.

6. The fan arrangement of claim 5, wherein said guide ramp is a first guide ramp and wherein said fan arrangement further comprises a second guide ramp mounted downstream of said first guide ramp viewed in said flow direction; and, said second guide ramp drops off in elevation and widens the flow cross section.

7. The fan arrangement of claim 5, said take-out opening being mounted in flow direction directly after said ignition coil in a flow cross section narrowed in correspondence to said first guide ramp.

8. The fan arrangement of claim 1, wherein said engine has a carburetor and wherein said fan arrangement further comprises a combustion air channel leading from said take-out opening to said carburetor.

9. The fan arrangement of claim 8, wherein said fan housing has a radial wall; and, said combustion air channel is guided through said radial wall.

10. The fan arrangement of claim 8, wherein said fan housing includes a fan cover having a channel formed therein connected to said carburetor air channel.

11. The fan arrangement of claim 1, further comprising a baffle plate for shielding relative to said fan wheel; said baffle plate following said peripheral contour of said fan wheel and rising in axial direction; and, said baffle plate being disposed in the region of said take-out opening.

12. The fan arrangement of claim 1, further comprising a guide surface disposed rearward of said guide ramp referred to said flow direction; and, said guide surface being aligned approximately horizontally and lying at approximately the elevation of said guide ramp.

13. The fan arrangement of claim 12, wherein said engine includes an ignition coil and said guide ramp is a first guide ramp and wherein said fan arrangement further comprises a second guide ramp mounted downstream of said first guide ramp viewed in said flow direction; and, said guide surface is disposed between said ignition coil and said second guide ramp; and, said take-out opening is subdivided into a vertical window and a horizontal window; and, said vertical window extends in axial direction and said horizontal window lies in said guide surface.

14. The fan arrangement of claim 1, wherein said fan housing is a spirally-shaped fan housing.

* * * * *

UNITED STATES PATENT AND TRADEMARK OFFICE
CERTIFICATE OF CORRECTION

PATENT NO. : 6,948,457 B2
DATED : September 27, 2005
INVENTOR(S) : Georg Maier et al.

It is certified that error appears in the above-identified patent and that said Letters Patent is hereby corrected as shown below:

Column 2.
Lines 26 and 36, delete "preseparators" and substitute -- preseparator --.

Column 6,
Line 48, delete "portal" and substitute -- portable --.

Column 7,
Line 2, delete "define" and substitute -- defines --.

Signed and Sealed this

Twenty-first Day of February, 2006

JON W. DUDAS
*Director of the United States Patent and Trademark Office*